US010160684B2

(12) United States Patent
Banaei

(10) Patent No.: US 10,160,684 B2
(45) Date of Patent: Dec. 25, 2018

(54) METHOD OF CO-DRAWING HYBRID INCOMPATIBLE MATERIALS

(71) Applicant: Flex Optronix Technologies, LLC, Orlando, FL (US)

(72) Inventor: Esmaeil Banaei, Orlando, FL (US)

(73) Assignee: Flex Optronix Technologies, LLC, Orlando, FL (US)

( * ) Notice: Subject to any disclaimer, the term of this patent is extended or adjusted under 35 U.S.C. 154(b) by 610 days.

(21) Appl. No.: 14/187,492

(22) Filed: Feb. 24, 2014

(65) Prior Publication Data
US 2014/0238473 A1 Aug. 28, 2014

Related U.S. Application Data

(60) Provisional application No. 61/768,506, filed on Feb. 24, 2013, provisional application No. 61/768,507, (Continued)

(51) Int. Cl.
C03B 23/037 (2006.01)
C03B 37/025 (2006.01)
(Continued)

(52) U.S. Cl.
CPC .............. C03B 23/037 (2013.01); B21C 9/00 (2013.01); B29C 47/0014 (2013.01); (Continued)

(58) Field of Classification Search
CPC .............. G02F 1/1339; G02F 1/13392; G02F 1/13394; G02F 1/13396; G02F 1/13398; (Continued)

(56) References Cited

U.S. PATENT DOCUMENTS 4,425,421 A * 1/1984 Rutges ................... G03C 8/423
283/112
4,467,078 A * 8/1984 Kolycheck ........... C08G 18/672
522/96

(Continued)

FOREIGN PATENT DOCUMENTS

JP         2000147287 A  *  5/2000
WO    WO 2011161391 A1  * 12/2011  ....... B32B 17/10036
WO    WO-2013131120 A1  *  9/2013  ............... D01F 8/00

OTHER PUBLICATIONS

"Melt Temperatures" [retrieved from http://plastictroubleshootercom/ThePlasticTroubleshooter/melt_temps.htm on Jan. 6, 2018].*
(Continued)

Primary Examiner — Eric R Smith
(74) Attorney, Agent, or Firm — Brinks Gilson & Lione

(57) ABSTRACT

A method of drawing different materials includes forming a first material into a preform body defining at least one channel extending therethrough having a first cross-sectional area. A first element formed of a second material is inserted into the channel and with the preform body creates a preform assembly. The first element has a cross-sectional area that is less than the cross-sectional area of the channel, and the second material has a higher melting temperature than the first material. The preform assembly is heated so that the first material softens and the preform assembly is drawn so that the preform body deforms at a first deformation rate to a smaller cross-sectional area and the first element substantially maintains a constant cross-sectional area throughout the drawing process. Upon completion of the drawing step, the cross-sectional area of the channel is equivalent to the cross-sectional area of the first element.

2 Claims, 6 Drawing Sheets

Related U.S. Application Data filed on Feb. 24, 2013, provisional application No. 61/914,606, filed on Dec. 11, 2013, provisional application No. 61/914,616, filed on Dec. 11, 2013.

(51) Int. Cl.

| | | |
|---|---|---|
| *C03B 37/026* | (2006.01) | |
| *C03B 37/027* | (2006.01) | |
| *B21C 9/00* | (2006.01) | |
| *B29C 55/02* | (2006.01) | |
| *B29C 55/22* | (2006.01) | |
| *B29C 47/00* | (2006.01) | |
| *B29D 7/01* | (2006.01) | |
| *B29D 11/00* | (2006.01) | |
| *G02B 6/02* | (2006.01) | |
| *G02B 6/122* | (2006.01) | |
| *B29C 55/06* | (2006.01) | |
| *B29K 105/00* | (2006.01) | |
| *B29L 11/00* | (2006.01) | |

(52) U.S. Cl.
CPC ............ *B29C 55/02* (2013.01); *B29C 55/023* (2013.01); *B29C 55/06* (2013.01); *B29C 55/22* (2013.01); *B29D 7/01* (2013.01); *B29D 11/00634* (2013.01); *B29D 11/00721* (2013.01); *C03B 37/025* (2013.01); *C03B 37/026* (2013.01); *C03B 37/027* (2013.01); *C03B 37/0256* (2013.01); *C03B 37/02754* (2013.01); *C03B 37/02781* (2013.01); *B29K 2105/256* (2013.01); *B29L 2011/0066* (2013.01); *C03B 2203/02* (2013.01); *C03B 2203/04* (2013.01); *C03B 2203/10* (2013.01); *C03B 2203/12* (2013.01); *C03B 2203/14* (2013.01); *C03B 2203/16* (2013.01); *G02B 6/02314* (2013.01); *G02B 6/02385* (2013.01); *G02B 6/1225* (2013.01); *Y10T 428/24273* (2015.01); *Y10T 428/2929* (2015.01)

(58) Field of Classification Search
CPC ............. G02F 1/1341; G02F 1/133308; G02F 2001/133311–2001/133334
See application file for complete search history.

(56) References Cited

U.S. PATENT DOCUMENTS

| | | | | |
|---|---|---|---|---|
| 4,923,278 | A * | 5/1990 | Kashyap | G02B 6/02 385/100 |
| 5,153,066 | A * | 10/1992 | Tanaka | D01F 1/04 428/11 |
| 5,361,320 | A * | 11/1994 | Liu | G02B 6/032 385/125 |
| 5,610,742 | A * | 3/1997 | Hinata | G02F 1/1339 349/153 |
| 5,708,252 | A * | 1/1998 | Shinohara | B23K 26/0738 219/121.73 |
| 5,812,232 | A * | 9/1998 | Shiroto | G02F 1/13392 349/153 |
| 2007/0152956 | A1* | 7/2007 | Danner | G02F 1/161 345/107 |
| 2009/0155496 | A1* | 6/2009 | Wilderbeek | D01D 5/426 428/1.33 |
| 2010/0021094 | A1* | 1/2010 | Kaufman | F16C 11/0614 384/209 |
| 2013/0141656 | A1* | 6/2013 | Kujawa | B32B 17/10036 349/33 |

OTHER PUBLICATIONS

Machine translation of JP2000-147287A.*

* cited by examiner

METHOD OF CO-DRAWING HYBRID INCOMPATIBLE MATERIALS

CROSS REFERENCE TO RELATED APPLICATIONS

This application claims the benefit of U.S. Provisional Application Ser. Nos. 61/768,506, filed Feb. 24, 2013; 61/768,507, filed Feb. 24, 2013; 61/914,606, filed Dec. 11, 2013; and 61/914,616, filed Dec. 11, 2013, the disclosures of which are hereby incorporated herein by reference in their entireties.

FIELD OF THE INVENTION

The present disclosure generally relates to apparatuses and methods for drawing fibers from a preform. More particularly, the present disclosure relates to a method of co-drawing materials having different thermal and mechanical properties in the same preform.

BACKGROUND OF THE INVENTION

Techniques for heating and drawing glass into fine fibers have been known for millennia. It was, however, in the 1930s when this technique was used for the textile industry. As explained below, this technique was employed later in the 19th century to make glass optical fibers.

Light guidance in transparent pipes and water streams historically inspired the use of optical fibers for light transmission. The light guiding process using the total internal reflection was first demonstrated by Daniel Colladon and Jacques Babinet in Paris in the early 1840s. It found applications such as illumination in dentistry, image transmission and internal medical examination early in the twentieth century. Later in the 1920s the concept of modern glass fibers with a glass core and a lower index cladding for a more suitable index guiding was introduced. Low-index oils and waxes were mostly used to produce the lower-index cladding. In the 1950s E. Curtiss at the University of Michigan produced the first glass-core fiber with glass cladding in order to minimize the interference of the guided light with the surrounding environment. Advances in the fiber fabrication process and the proper choice of glass materials rendered the optical fibers as feasible tools for long-distance optical telecommunications as well as many other applications such as sensing and imaging. In the 1990s micro-structured fibers and photonic crystal fibers were developed where the guiding mechanism was based on light diffraction from periodic structures in fiber. Photonic crystal fibers could potentially transmit higher light powers and would give the possibility of dispersion adjustment based on structure design. In recent years a new class of fibers (multi-material fibers) emerged based on thermal co-drawing of multiple types of materials all with thermally and mechanically compatible materials. This new class of fibers brought novel functionalities (not limited to optical light transmission) to fibers. An example of this includes fibers with semiconducting glass and metal electrodes integrated into a single fiber for light detection applications. The field of multi-material fibers recently went even further to include piezoelectric fibers and multi-material fibers for structured micro- and nano-sphere fabrication.

Throughout the history of development of fibers, thermal fiber drawing has been the most popular and the most successful fabrication method. Simplicity and speed of thermal fiber drawing made optical telecommunications an economically viable technology. The circularly symmetric geometry of optical fiber fabrication was indeed inspired by the natural shape of water streams and glass fibers that were produced through heating and pulling of glass.

In the fiber drawing process, a softened material has the tendency to round up into fibers with circular cross-section to minimize the surface free energy under surface tension. However, in the longitudinal direction the tension along the fiber, which is produced by the intentional pulling process, dominates the surface tension and leaves the fiber longitudinally elongated. During the pulling process, the material is kept at the softening temperature for a brief period of time, just enough to stretch it into fiber. It is then gradually cooled to solidify the stretched form that is called a fiber. This is the fiber fabrication process that has been used for centuries in the textile industry and decades in optics. In recent years fibers with non-circular cross-sections have been created by giving an asymmetric geometry to the fiber preform and trying to maintain that geometry by not overly heating the fiber during the drawing process. It is possible to maintain non-circular structures by not giving the material enough freedom (low viscosity) and time to round up to a circular shape. Fibers made with this method having hexagonal, square, rectangular and even D-shaped cross-sections have been reported for various applications. For all fibers of different materials for various applications over decades the circular symmetry of fiber preform heating has allowed for equal scale reduction in both transverse directions (height and width) across the fiber. This results in maintaining the aspect ratio of the preform in the final drawn fiber by allowing equal shrinkage in both transverse directions.

The conventional fiber drawing method that has been worked on for about 4 decades involves direct thermal drawing of a scaled up version of the final fiber that is called a fiber preform. More recently, multi-material fibers have been introduced in which a fiber preform has multiple components with various materials all integrated in the scaled up preform prior to the fiber draw as illustrated in FIGS. 1-2. The fiber preform 110 is comprised of a body 112 of a first material with at least one element 114 of a second material embedded therein. FIG. 1 shows two elements 114 of a second material embedded in the body 112. Conventional multi-material fiber drawing relies on matching the thermal and mechanical properties of components of the preforms in a way that, within a common range of temperatures, all components 112, 114 soften to some degree. Therefore, all components 112, 114 will flow together with similar viscosities and will experience a more or less identical or proportional size reduction as illustrated in FIG. 2 where the finished fiber 120 includes the elements 112, 114 with relative sizes substantially proportional to those in the preform 110. In this case, the thermal, mechanical and fluidic properties of all components 112, 114 must match closely in order for the fiber to draw uniformly with all components flow and scale down similarly. This limits the choice of materials and applications of multi-material and multi-component fibers. With conventional fiber drawing methods for any given application or function, it is often not possible to use the best of each class of materials for the specific application while maintaining similar thermal and mechanical properties. In other words, performance of the ultimate device made with such multi-material fibers may be compromised because of the limited choice of materials with matching thermal and mechanical properties.

Therefore, a method of drawing incompatible materials is needed to preclude the necessity of combining materials of like thermal characteristics.

SUMMARY OF THE INVENTION

The present disclosure is generally directed to a method of co-drawing two or more different materials in the same preform. This includes a first material in a geometric preform body defining at least one channel extending therethrough along the length of preform (axis of symmetry) and having a first cross-sectional area. A second element formed of a second material is inserted into and through the channel and in combination with the preform body creates a preform assembly. The second element has a cross-sectional area smaller than the cross-sectional area of the channel, and the second material has a higher melting temperature than the first material or has thermal and mechanical properties that preclude it from conventional thermal drawing. The preform assembly is heated to a softening temperature of the first material and the preform assembly is drawn in such a manner that the preform body deforms at a first material deformation rate to a smaller cross-sectional area and the second element substantially maintains a constant cross-sectional area throughout the drawing process. Upon completion of the drawing step, the cross-sectional area of the channel becomes substantially the same as the cross-sectional area of the second element.

Since the first element is drawn from a short, large-cross-sectional-area preform into an extended length of a small-cross-sectional-area fiber, the second element has to be supplied continuously in order to create an extended length of uniform fiber comprising both first and second elements. The second element can be supplied and fed into the thermal drawing either with a motorized system with adjustable feeding speed or with a low-friction system that allows the second element to be pulled by the viscous flow of the first element.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF PREFERRED IMPLEMENTATIONS

Figure 2:
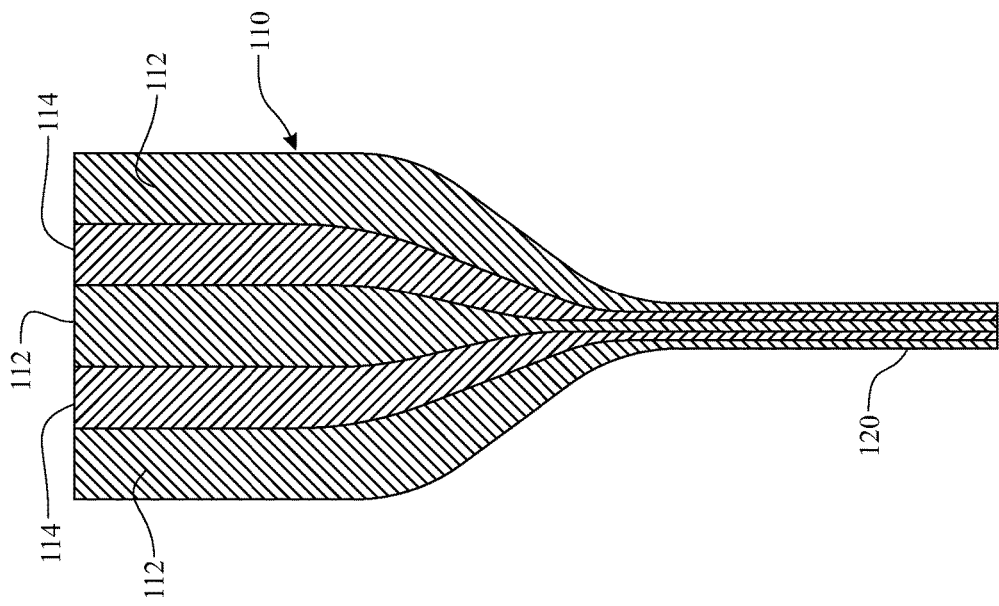
FIG. 2 presents a cross-sectional view of the preform assembly shown in FIG. 1 and taken along the line 2-2, illustrating the simultaneous reduction in size of all elements of the preform assembly with cross-section shown in FIG. 1.
Figure 1:
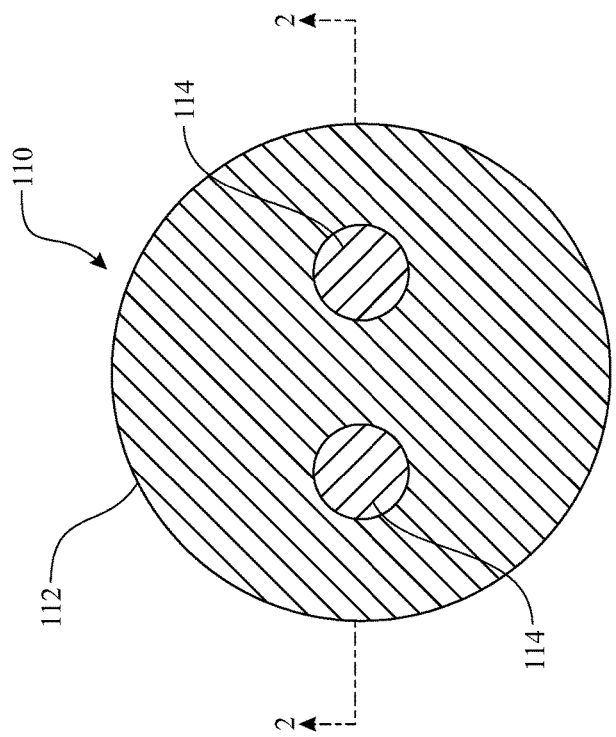
FIG. 1 presents a top plan cross-sectional view of a prior art preform assembly having two inserts therein for drawing to a smaller diameter fiber assembly.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIGS. 3-4. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A method for co-drawing of materials with far different thermal and mechanical properties in the same preform is disclosed herein. Many combinations of materials can be co-drawn with this method. The materials of one preform can be divided into two groups: stretchable and non-stretchable materials at a given temperature range. It is noticeable that some non-stretchable materials can be stretchable at a different temperature. Stretchable components are the ones that can be thermally softened and stretched for conventional thermal drawing. Non-stretchable components, however, are the ones that will be fed mechanically into the thermal drawing process without undergoing any softening for fluidic flow. Examples of these materials are metals with high melting point, high-temperature glasses and polymers, ceramics, compound materials without thermal phase transitions at low temperatures; polymeric materials other than thermoplastics are also examples of non-stretchable materials. Stretchable materials may also include most of the above-mentioned materials as far as they can soften and flow at a temperature that does not soften the non-stretchable components. The combination of a high-temperature polymer (or glass) and a low-temperature polymer (or glass) is one example. Another example can be a high temperature metal wire in combination with a polymer or glass material having a lower softening temperature. Yet another more complex example can be co-drawing of a glass fiber with any arbitrary structure in a polymeric matrix together with some metal wires that can be eventually used for poling of the materials in the glass or polymer components.

Figure 4:
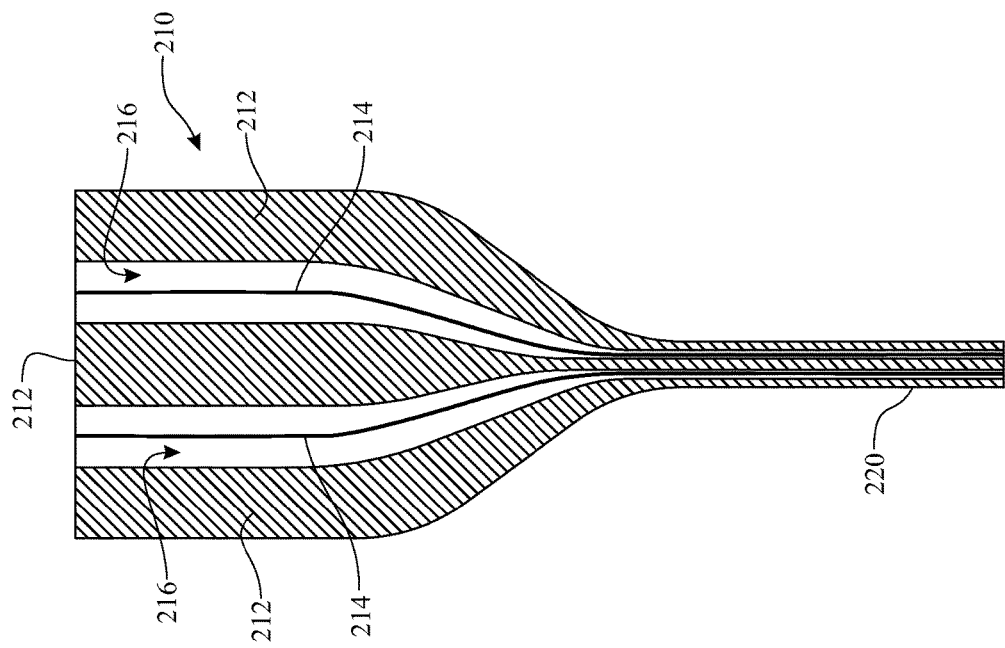
FIG. 4 presents a cross-sectional view of the preform assembly shown in FIG. 3 and taken along the line 4-4, illustrating the reduction in size of the preform body and the shrinking of the hollow cores about the non-deforming wires of the preform assembly of FIG. 3, in accordance with one embodiment.
Figure 3:
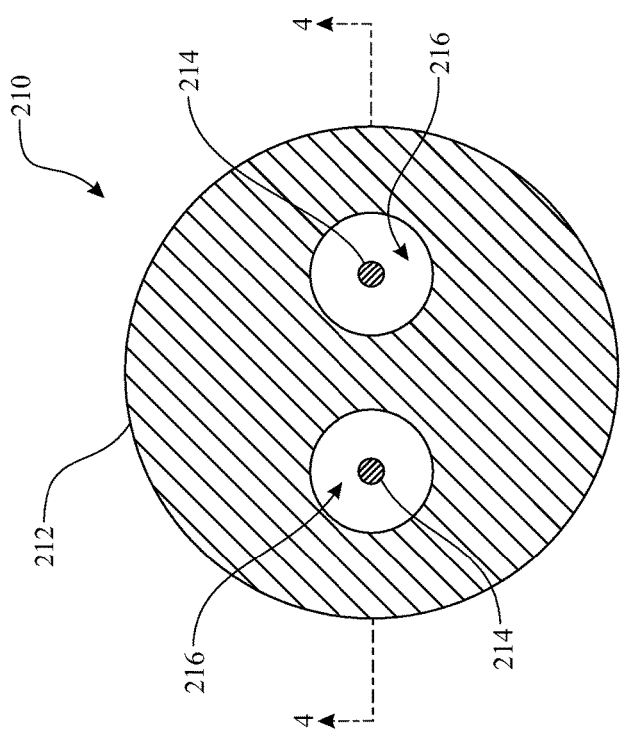
FIG. 3 presents a top plan cross-sectional view of a preform assembly according to one embodiment of the present invention wherein non-deformable wires of a second material are received in respective larger diameter hollow cores.

An explanation of the process for co-drawing in the same preform materials having different thermal and mechanical properties starts with a simple structure including two non-stretchable metal wires (as defined above) with a polymer jacket surrounding them as illustrated in FIGS. 3-4. The method includes a hybrid drawing process in which a first element 212 of the preform assembly 210 are softened and stretched by regular fiber pulling, while some others such as wires 214 are non-thermally fed into the softened part of the preform and incur little to no deformation. In the exemplary implementation of FIGS. 3-4, the preform assembly 210 is shown being drawn to a smaller fiber 220. As with a regular polymer fiber drawing method, all features and dimensions in the polymeric component of the preform will shrink during the thermal drawing. However, the metal wires 214 will retain their size and shape, as their softening temperature is not reached. Therefore, in order to have tight fit of the polymeric jacket about the metal wires in the final drawn fiber the process is started with the preform body 212 having a large hollow core 216 for receiving each metal wire 214. For example, non-stretchable elements (e.g., wires) may be rolled on some type of pulley on the top of the furnace and may be fed mechanically into the channels by turning the pulleys or any other similar mechanism. Alternatively, the non-stretchable elements may be fed manually.

In one embodiment, the wire may be connected to the pulley on the top end, and grabbed by the shrunk preform from the bottom to hold the wire in place. At the start of the drawing process, when the preform has yet to soften and shrink, the loose components (wires) may be attached to the bottom of the preform.

The hollow cores 216 shrink down after drawing to the cross-sectional size (or slightly smaller) of the wires 214. Initially, each wire 214 can be freely and loosely hanging in its respective hollow core 216. After the softening of preform body 212 and as size reduction starts the hollow core 216 starts shrinking to the point that it matches with the size of the wires 214 and pulls the wire with the polymer fluidic flow. If the wire is held on a very lightweight spooler (not shown) that can rotate with very low friction on a pulley then the wires 214 can be continuously fed into the draw as the polymeric component (preform body 212) continues to draw. Feeding of the wires could alternatively be done using a motorized pulley that allows for adjustment of the feeding speed and tension.

Figure 5:
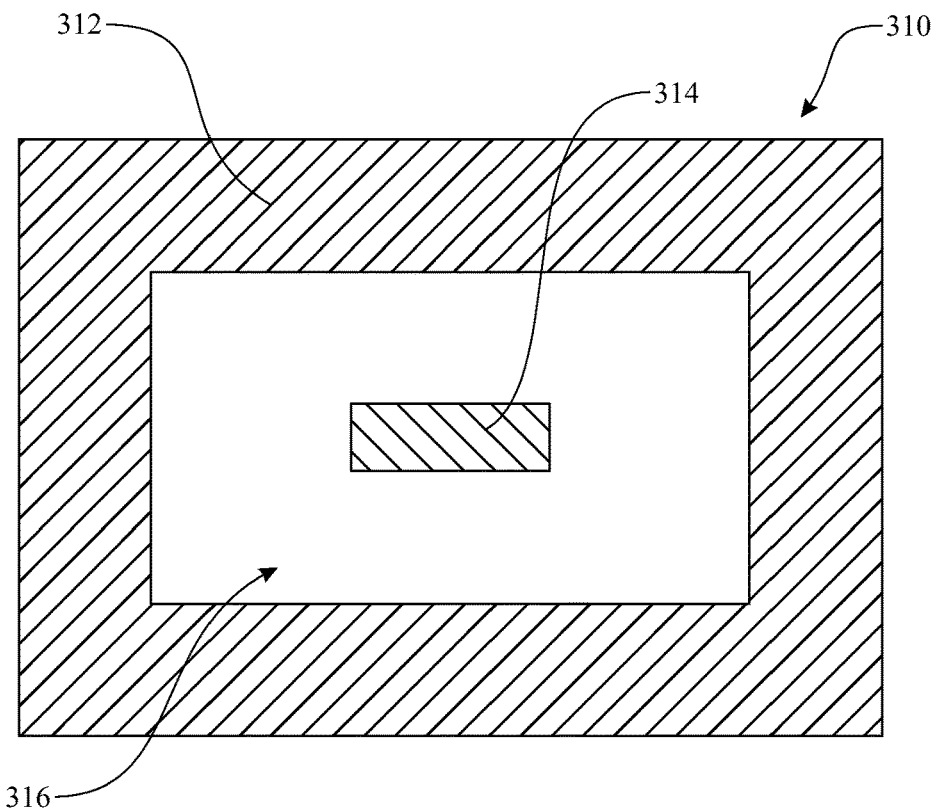
FIG. 5 presents a cross-sectional view of an alternate embodiment rectilinear preform assembly of a first deformable material and a second non-deformable element received therein, in accordance with one embodiment.
Figure 6:
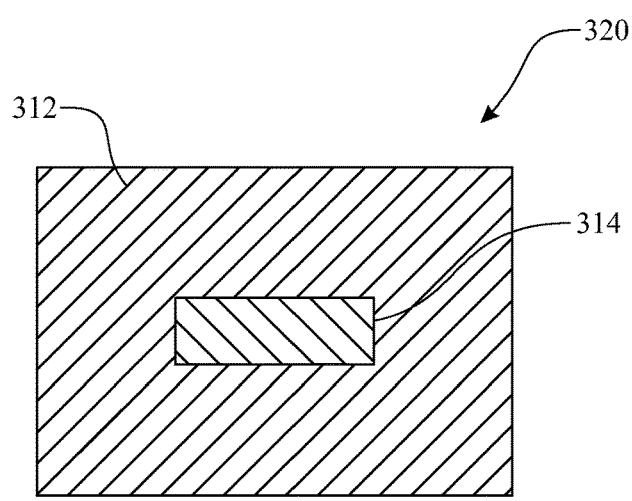
FIG. 6 presents a cross-sectional view of the drawn fiber from the preform of FIG. 5 wherein the preform body has been drawn to closely form about the non-deformable element.

Turning now to FIGS. 5-6, an alternate embodiment preform assembly 310 is illustrated wherein a rectilinear preform body 312 formed of a first material defines a central hollow rectilinear core 316. The hollow rectilinear core 316 can be filled with an inert gas or air under either negative or positive pressure. A non-deformable rectilinear element 314 is centrally disposed in hollow core 316. As the preform assembly 310 is heated, the preform body 312 approaches its melting temperature and is gradually shrunk around element 314 while maintaining a cross-sectional form substantially proportional to the preform body 312. The final drawn rectilinear fiber 320 maintains a rectilinear external configuration while the rectilinear hollow core 316 has been shrunk to closely receive the rectilinear element 314. The rectilinear element 314, having a higher melting temperature, is not deformed and maintains the same cross-sectional area throughout the drawing process.

Figure 7:
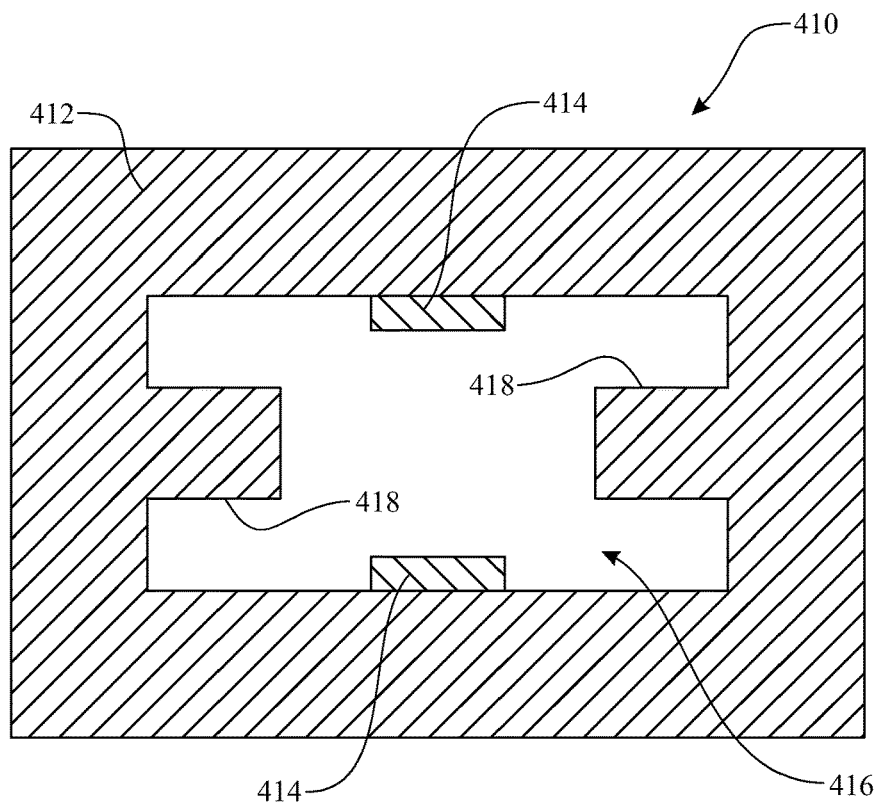
FIG. 7 presents a cross-sectional view of an alternate embodiment rectilinear preform assembly of a first deformable material having a complex hollow core configuration and a pair of a second non-deformable elements received therein.
Figure 8:
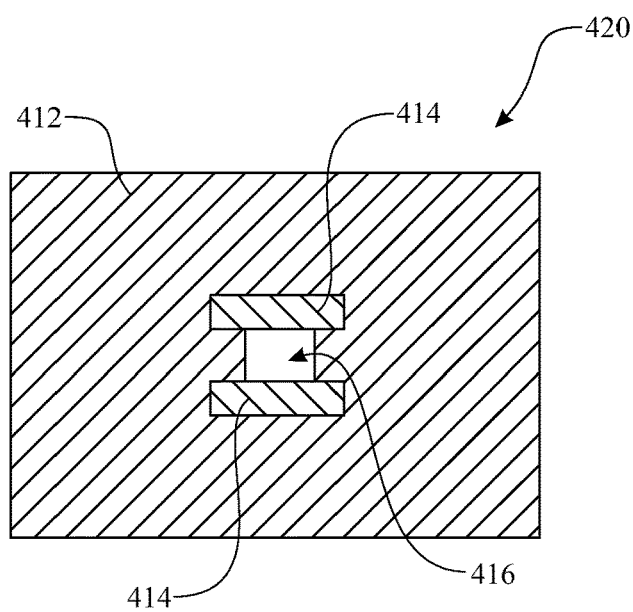
FIG. 8 presents a cross-sectional view of the drawn fiber from the preform of FIG. 7 wherein the preform body has been drawn to closely form about the non-deformable elements while maintaining a smaller post-drawn hollow core, in accordance with one embodiment.

Yet another embodiment is shown in FIGS. 7-8 wherein a preform assembly 410 includes a rectilinear preform body 412 having a substantially rectilinear hollow core 416. A pair of rectilinear non-deformable elements 414 is abutted to opposed walls of hollow core 416 and a pair of rails 418 extends toward a center of the hollow core 416 from the other two opposed walls of hollow core 416. The hollow rectilinear core 416 can be filled with an inert gas or air under either negative or positive pressure. As the preform assembly 410 is heated, the preform body 412 approaches its melting temperature and is gradually drawn and shrunk while maintaining a cross-sectional form substantially proportional to the preform body 412. As the preform body 412 is drawn and shrinks, the rails 418 linearly converge toward the center of hollow core 416 and at least marginally engage elements 414 in a manner to maintain elements 414 in a separated opposed configuration. The rectilinear elements 414, having a higher melting temperature, are not deformed and maintain the same cross-sectional area throughout the drawing process. The final drawn fiber 420 includes a reduced cross-section body 412 closely engaging elements 414 and defining a reduced hollow core 416 between elements 414.

Figure 9:
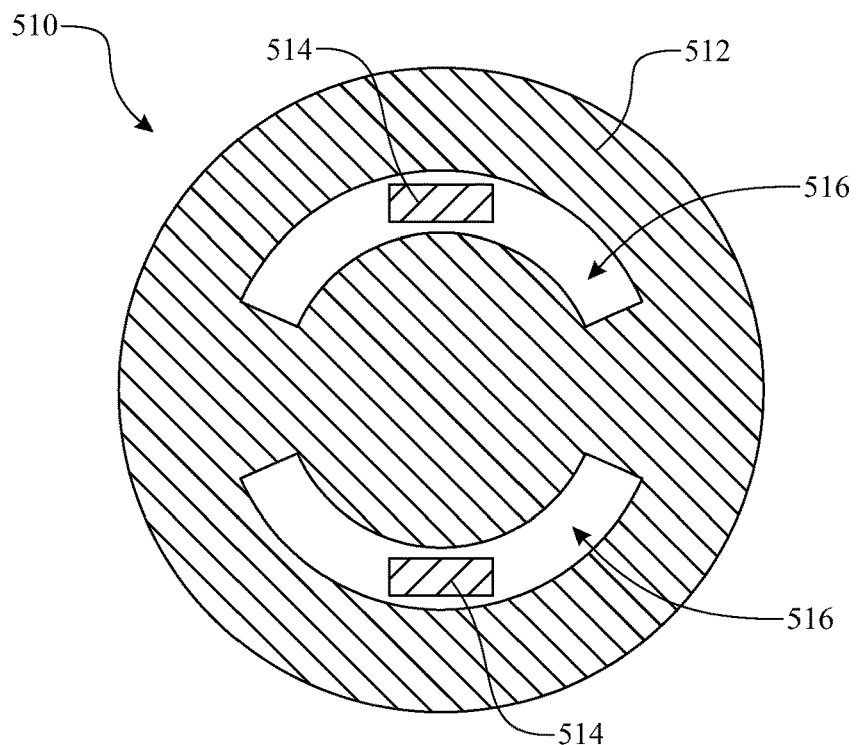
FIG. 9 presents a cross-sectional view of an alternate embodiment cylindrical preform assembly of a first deformable material defining a pair of arcuate hollow cores and a flexible, non-stretchable rectilinear element received in each core, in accordance with one embodiment.
Figure 10:
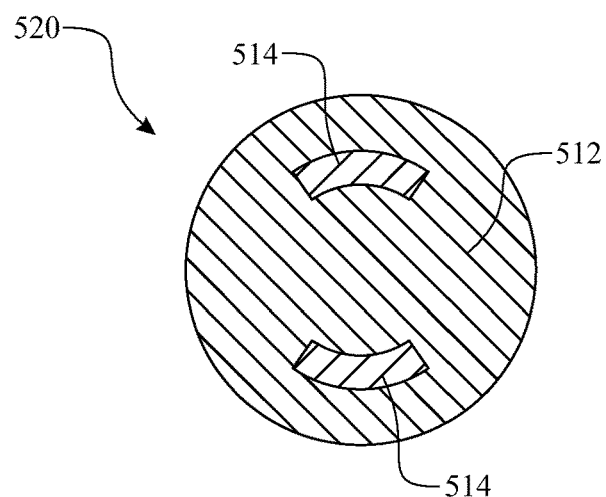
FIG. 10 presents a cross-sectional view of the drawn fiber from the preform of FIG. 9 wherein the preform body has been drawn to closely form about the flexible element wherein the flexible element is transversely deformed to arcuately conform to the shrunken arcuate hollow cores, in accordance with one embodiment.

A further embodiment is illustrated in FIGS. 9-10 wherein a preform assembly 510 includes a cylindrical preform body 512 defining a pair of arcuate hollow cores 516 concentrically arranged with respect to an outer surface of the preform body 512. A rectilinear element 514 formed of a flexible material is received in each hollow core 516. The hollow arcuate cores 516 can be filled with an inert gas or air under either negative or positive pressure. As the preform assembly 510 is heated, the preform body 512 approaches its melting temperature and is gradually drawn and shrunk while maintaining a cross-sectional form substantially proportional to the preform body 512. As the preform body 512 is drawn and shrinks, each arcuate hollow core 516 converges toward a respective element 514. As the hollow cores engage elements 514, the flexible nature of elements 514 assume the arcuate shape of cores 516. The flexed elements 514, having a higher melting temperature, are not deformed longitudinally and maintain the same cross-sectional area throughout the drawing process. The final drawn fiber 520 includes a reduced cross-section body 512 closely engaging and flexing elements 514 to an arcuate form cross-sectional form.

Examples of Applications:

In-Fiber Poling:

For many applications such as non-linear optical waveguides, poling of the waveguide material can be very important. In channel waveguides on chips this may be done by electrode contacts. In fibers, however, there is no reliable method for poling. Existing methods include: (1) electric field application from the outside of the fiber; and (2) molten metal electrode injection into fibers with hollow capillaries. The former method suffers from the long distance between the electrodes that requires extremely high voltage levels to create a sufficiently effective electric field at the core or the material that needs be poled, while the latter suffers from the short length, low conductivity, difficulty of injection, and mismatched melting temperatures of the metal and the fiber material that may lead to melting and deformation of the fiber. This may limit the choice of metals to those with considerably lower melting temperature than that of the fiber material. Materials, such as many types of glasses and non-linear organic materials, can be considered as candidates for such applications with this new method.

In most cases, poling occurs faster and more efficiently if the subject material is heated to some extent. Extra wire of proper material and resistance can be used in such fibers for simultaneous heating instead of heating of the whole fiber from the outside.

It is understood that the co-drawing process can utilize copper, indium tin oxide, tin, indium, gold, and the like.

In-Fiber Liquid Crystal Controlling:

The idea of filling photonic crystal fibers with liquid crystal for the purpose of making tunable photonic crystal fibers has been around for many years. A major subtlety has always been the high voltage application across the whole fiber as opposed to the liquid crystal channel only. Long distance between the electrodes typically mandates extremely high voltage levels to create a sufficiently effective electric field at the location of the liquid crystal channel. This becomes more important if the filled fiber in lengths more than a few centimeters is needed, because application of uniform high voltage is not practical for long fibers. Also operation of such devices in proximity hazardous materials and conditions will make these devices impractical as they compromise safety when close to high voltage sources.

With the disclosed method, hollow-channel glass or polymer fibers can be made with embedded electrodes for in-situ controlling of liquid crystal molecules. This can modify transmission properties for light propagation along the fiber or across the fiber. Such properties can then be tuned or switched by applying electric field to the liquid crystal channels.

Other components of liquid crystal devices such as polarizers, alignment films, compensators, retarder, etc., can also be similarly integrated into fibers if the softening temperature of their base materials is lower than that of the fiber. Such elements made of relatively high temperature polymers such as Polystyrene (PS), Polyimide (PI) and PolyVinyl Alcohol (PVA) can satisfy this requirement if the base material of the fiber is a lower temperature material such as PolyCarbonate (PC), Cyclic Olefin Polymer (COP), Poly methyl methacrylate (PMMA), etc.

Switchable Privacy Fibers and Fabrics, Switchable Liquid Crystal Devices

Several versions of switchable fibers can be made using the disclosed method: 1—Fibers doped with electrochromic materials in contact with metal electrodes for current injection. 2—Fibers with PDLC (Polymer-Dispersed Liquid Crystal) channels and metal electrodes (such as Indium Tin Oxide (ITO) or copper) to control them. 3—Fibers with regular liquid crystals or their mixtures with other materials sandwiched between polarizers (polarizers can be higher temperature POLAROID strips fed into the draw as one out of many non-stretchable components).

In lieu of metal electrodes, strips of higher temperatures plastic coated with ITO or any other conductive or partially conductive material can also be used. ITO coated on PET polymer is one commonly used example. Wires can also be metal strips instead of metal wires.

This technique can be applied to most liquid crystal device designs and configurations using a wide variety of liquid crystal materials, composites and mixtures. Such fibers with liquid crystal switching capability and in-fiber elements can be used for applications such as in-fiber liquid crystal light shutters or attenuators for light intensity and or phase modulation.

In Fiber Light Emitting Diode or Photovoltaic

Light emitting diodes (LEDs) and photovoltaic (PV) devices usually comprise several layers of materials that do not necessary match in terms of their mechanical and thermal properties. Layers are either deposited or coated one by one to create the functional multi-layer stack. With this invention, one may create the LED or PV (either organic or inorganic) on a flexible substrate and feed them through this fiber drawing process to embed them into a fiber form which resembles thread. This can be used for flexible light emitting or photo-voltaic fabrics. Alternatively, in the case of Organic LED (OLED) or Organic PV (OPV) one case match the properties of polymeric and organic semiconducting layer, but still benefit from higher conductivity and reliability of the ITO which is used as the transparent conductive layer in almost all commercial electronic devices including displays. ITO is commercially available in on many solid or flexible substrates including Polyethylene terephthalate (PET) whose melting temperature is around 260 C. ITO has a melting temperature between 1500 C and 2000 C, while most polymeric and organic materials melt below 200 C. Therefore, all low-temperature elements can be assembled into a preform (element one) with some channels left for at least one ITO-coated PET film (element two). After drawing, we will have OPV or OLED devices in contact with and sandwiched between ITO layers of injection or collection of electrons for devices to function.

Incorporation of Scattering Layer

Incorporation of scattering and diffusive materials in transparent waveguides has shown to be useful for applications such as waveguide-based backlighting for displays and luminescent solar concentrators. This invention allows for integration of low-cost scattering materials such as Teflon PTFE into polymer fibers or sheets while the softening temperature of Teflon is on the order of 100 C higher than that of typical polymers. Teflon PTFE provides Lambertian scattering at relatively low loss which has made it a widely used candidate for other applications such as optical integrating spheres.

Figure 11:
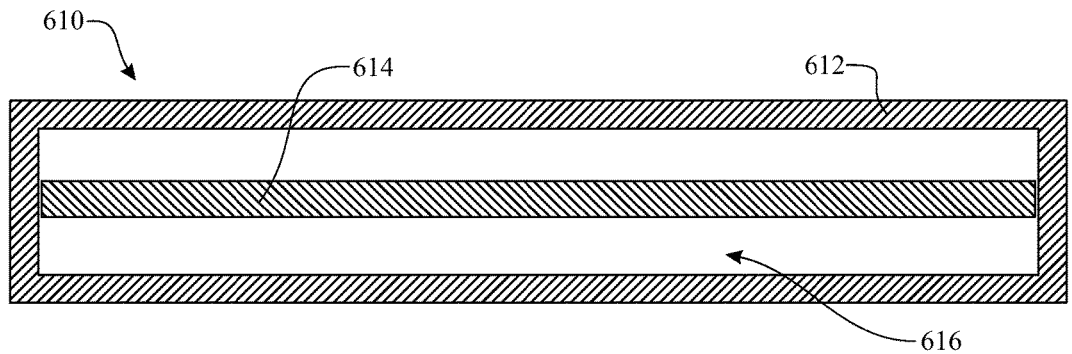
FIG. 11 presents a plan cross-sectional view of an alternate embodiment rectilinear preform assembly of a first deformable material and a non-deformable sheet core element received therein, in accordance with one embodiment.
Figure 12:
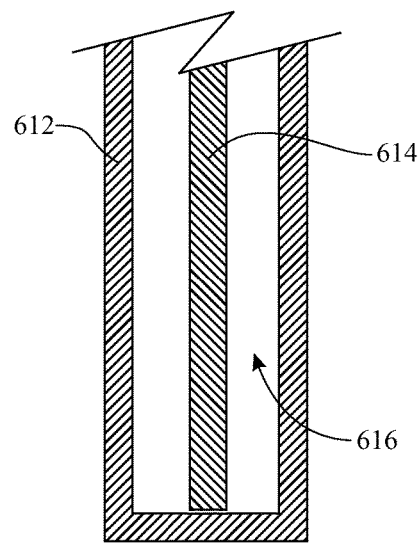
FIG. 12 presents an elevational cross-sectional view of the preform of FIG. 11, in accordance with one embodiment.
Figure 13:
FIG. 13 presents a plan cross-sectional view of the drawn sheet from the preform of FIG. 5 wherein the preform body has been drawn to closely form about the non-deformable sheet core, in accordance with one embodiment.

All of the ideas explained above can be similarly applied to the thermal sheet drawing method as illustrated in FIGS. 11-13 wherein a preform assembly 610 includes a large aspect ratio body 612 having a large width dimension and defining a central rectilinear hollow core 616. A rectilinear sheet element 614 formed of a sheet material having a higher thermal melting temperature than the preform body 612 is received in the hollow core 616. The hollow core 616 can be filled with an inert gas or air under either negative or positive pressure. As the preform assembly 610 is heated along the long width dimension on opposing sides of the preform body 612, the preform body 612 approaches its melting temperature and is gradually drawn and shrunk while substantially maintaining its preform width. As the preform body 612 is drawn and shrinks, the preform body closely engages the sheet element 614. The sheet element 614, having a higher melting temperature, is not deformed longitudinally and maintains the same cross-sectional area throughout the drawing process. The final drawn sheet 620 includes a reduced cross-section body 512 closely engaging sheet element 614 to form a laminated sheet form 620. In such manner heat is applied along a linear width of the preform 610 to draw a composite sheet having a substantially constant width while reducing the thickness of the preform 610. Non-stretchable sheets may replace non-stretchable wires if necessary.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A switchable liquid crystal device manufactured by providing a preform body comprising one or more first materials, the preform body defining a channel extending therethrough, the channel having a first cross-sectional area; wherein a first element and a second element formed of one or more second materials including a transparent conductor are inserted into and through the channel in the preform body and in combination with the preform body, creating a preform assembly; wherein each of the first and second elements has a cross-sectional area that is less than the cross-sectional area of the channel, and further wherein all the one or more second materials melt at higher melting temperatures than all of the one or more first materials;
heating the preform assembly to a point where the one or more first materials soften; and
drawing the preform assembly into a reduced preform body in such a manner that the preform body deforms to define a fiber of smaller cross-sectional area of the channel and the cross sectional areas of each of the first and second elements do not change as much as the cross sectional area of the one or more first materials does throughout the drawing process, wherein the fiber has a cross-section, in which the at least one first material surrounds the first and second elements,
wherein the first element includes a first plastic strip coated with the transparent conductor, and the second element includes a second plastic strip coated with the transparent conductor, wherein upon completion of the drawing step, the second element is spaced apart from the first element in a separated opposed configuration,
wherein the reduced preform body leaves a core space extending between the first element and the second element and from the first element to the second element along the channel, the core space being free of the at least one first material and of the at least one second material, the at least one first material delimiting the core space on two first opposite sides of the core space between the first element and the second element, and the core space extending from the first element to the second element on both of the two first opposite sides, wherein the first element and the second element delimit the core space on two second opposite sides extending from one of the two first opposite sides to the other one of the two first opposite side, and wherein the core space is filled with one or more liquid crystal materials, the liquid crystal materials contacting the at least one first material at the two first opposite sides, and the liquid crystal materials contacting the first and second elements at the two second opposite sides.

2. The switchable liquid crystal device of claim 1, wherein the space free of the first material and of the at least one second material between the first and second elements is bordered on the two opposite sides by a pair of rails of the first material extending along the channel between the first and second elements.

\* \* \* \* \*